US008275746B2

(12) United States Patent
Vadavia et al.

(10) Patent No.: US 8,275,746 B2
(45) Date of Patent: Sep. 25, 2012

(54) VIDEO AND MULTIMEDIA DISTRIBUTION SYSTEM

(75) Inventors: Rajesh Vadavia, Brossard (CA); Claudio Castravelli, Montreal (CA)

(73) Assignee: V V S Virtual Video Systems (Canada) Inc., Montreal, Quebec (CA)

( * ) Notice: Subject to any disclaimer, the term of this patent is extended or adjusted under 35 U.S.C. 154(b) by 0 days.

(21) Appl. No.: 13/078,532

(22) Filed: Apr. 1, 2011

(65) Prior Publication Data

US 2011/0184744 A1 Jul. 28, 2011

Related U.S. Application Data

(62) Division of application No. 11/881,315, filed on Jul. 26, 2007, now Pat. No. 7,941,477.

(60) Provisional application No. 60/833,247, filed on Jul. 26, 2006.

(51) Int. Cl.
*G06F 17/00* (2006.01)
(52) U.S. Cl. .......................... 707/636; 713/194
(58) Field of Classification Search .......... 707/636–644, 707/804–809; 713/189–194
See application file for complete search history.

(56) References Cited

U.S. PATENT DOCUMENTS

| | | | | |
|---|---|---|---|---|
| 6,389,538 | B1 * | 5/2002 | Gruse et al. ................... | 713/194 |
| 7,209,900 | B2 | 4/2007 | Hunter et al. | |
| 2002/0120939 | A1 | 8/2002 | Wall et al. | |
| 2002/0154892 | A1 | 10/2002 | Hoshen et al. | |
| 2003/0088544 | A1 | 5/2003 | Kan et al. | |
| 2004/0162871 | A1 | 8/2004 | Pabla et al. | |
| 2004/0205339 | A1 | 10/2004 | Medin | |
| 2005/0086300 | A1 | 4/2005 | Yeager et al. | |
| 2005/0223102 | A1 | 10/2005 | Zhang et al. | |
| 2005/0235047 | A1 | 10/2005 | Li et al. | |
| 2006/0005224 | A1 | 1/2006 | Dunning et al. | |
| 2006/0008256 | A1 | 1/2006 | Khedouri et al. | |
| 2006/0015637 | A1 | 1/2006 | Chung | |
| 2006/0037037 | A1 | 2/2006 | Miranz | |
| 2006/0069648 | A1 | 3/2006 | Iima et al. | |
| 2007/0033531 | A1 | 2/2007 | Marsh | |
| 2007/0061393 | A1 | 3/2007 | Moore | |

FOREIGN PATENT DOCUMENTS

WO 0122725 A1 3/2001

(Continued)

OTHER PUBLICATIONS

Pathan et al., "A Taxonomy and Survey of Content Delivery Networks", Technical Report, GRIDS-TR-2007-4, Grid Computing and Distributed Systems Laboratory, The University of Melbourne, Australia, Feb. 12, 2006 [Retrieved on Feb. 17, 2010]. Retrieved from the Internet URL: http://www.gridbus.org/reports/CDN-Taxonomy.pdf.

(Continued)

*Primary Examiner* — Wilson Lee
(74) *Attorney, Agent, or Firm* — Burns & Levinson LLP; Jerry Cohen; Orlando Lopez

(57) ABSTRACT

Digital media content-on-demand hosting/delivery system for using an n-tier, multi dimension dynamic data technology to distribute digital content and manage information and comprising separate delivery and end-user systems with separate but compatible software, the hosting/delivery system being sub-divided into distributed hosting clusters serving small groups of users, ensuring local balance and overcoming diversity of connection/streaming speeds of end users.

3 Claims, 5 Drawing Sheets

FOREIGN PATENT DOCUMENTS

| | | |
|---|---|---|
| WO | 0173574 A1 | 10/2001 |
| WO | 2008011720 A1 | 1/2008 |

OTHER PUBLICATIONS

Cahill et al., "VCDN: A Content Distribution Network for High Quality Video Distribution", In Proceedings of the Information Technology & Telecommunications Conference (IT&T2003), Letterkenny, Ireland, Oct. 2003 [Retrieved on Feb. 17, 2010]. Retrieved from the Internet at URL: http://www.cs.ucc.ie/misl/publications/files/itt03cahill.pdf.

Dilley et al., "Globally Distributed Content Delivery", IEEE Internet Computing, vol. 6, Issue 5, Sep./Oct. 2002, pp. 50-58.

International Search Report and Written Opinion for PCT/CA2007/001332 mailed date Oct. 26, 2007.

\* cited by examiner

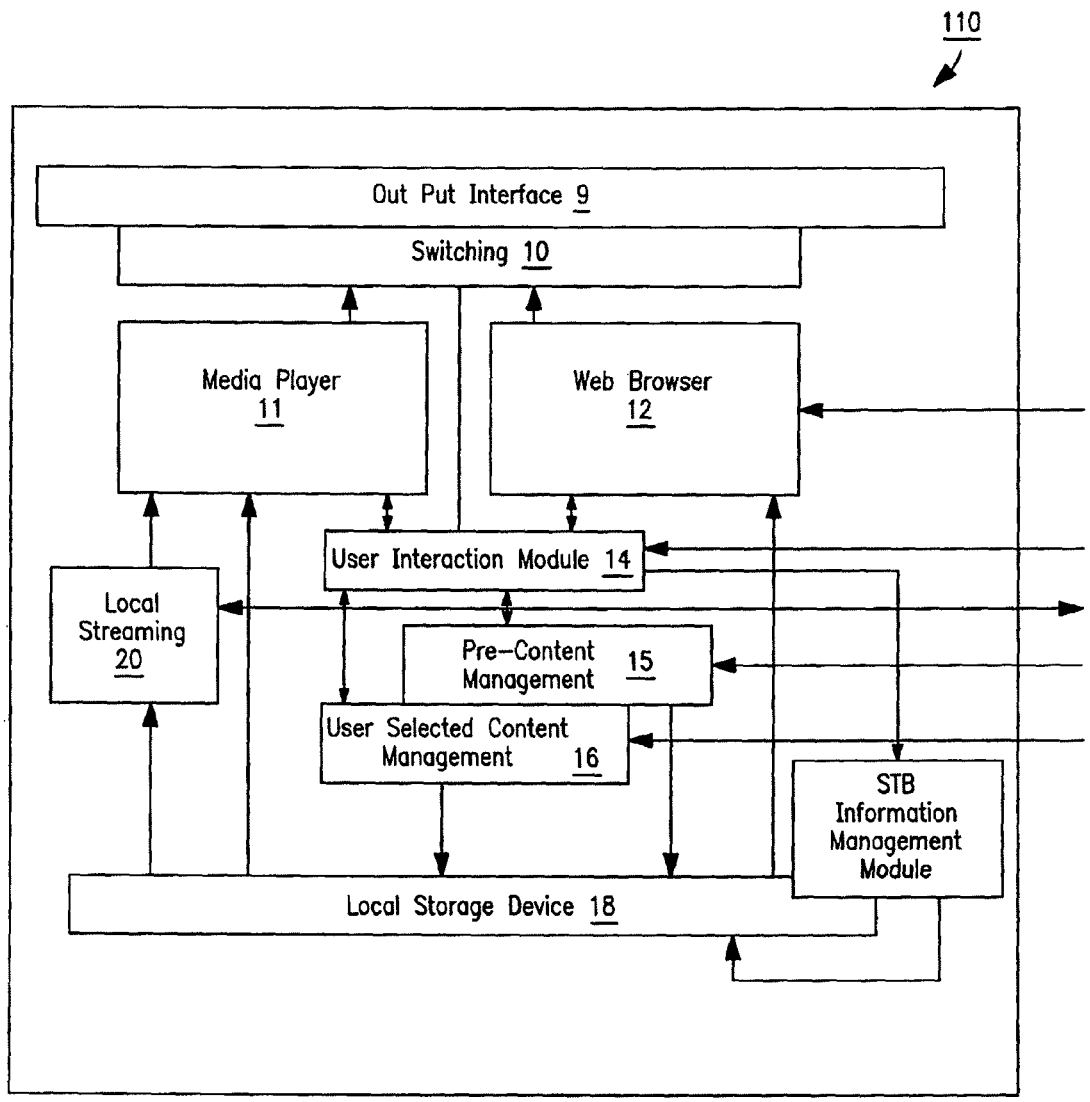
Fig. 1-b

VIDEO AND MULTIMEDIA DISTRIBUTION SYSTEM

CROSS REFERENCE TO RELATED APPLICATIONS

The present application is a divisional application of the co-pending U.S. Utility application Ser. No. 11/881,315, filed on Jul. 26, 2007, entitled, "VIDEO AND MULTIMEDIA DISTRIBUTION SYSTEM," which claims priority to U.S. Provisional Application Ser. No. 60/833,247 filed Jul. 26, 2006, entitled, "DISTRIBUTED INTERACTIVELY MANAGED CELL ARCHITECTURE FOR A VIRTUAL VIDEO STORE," all of which are incorporated herein in their entirety by reference.

FIELD AND BACKGROUND OF THE INVENTION

The present invention relates to video on demand or content on demand systems generally used for a service that provides digital video and other digital multimedia content to the user at his or her request. Current commercial solutions do not provide an ability to access seamlessly any content that is made available by content providers. Current solutions are impossible to deploy for unlimited content and unlimited end users.

Existing video-on-demand (VOD) [or other content-on-demand (COD)] services allow user to access digital media such as movies and TV shows through a transport medium such as cable, satellite, fiber optics network or twisted pair copper wire (typical telephony network). Currently, VOD services are served by systems consisting of a head-end provider operating through a distribution network to provide content to client terminals of end users. Prior art approaches also include proxy servers, which are in between the head-end provider and plural end users such that the proxy servers provide various services that include system administration, protocol management and security to enhance the performance of the system.

Therefore, it would be beneficial if VOD systems could provide content without the use of proxy servers or other systems that reduce the overall bandwidth of the system and thereby reduce the throughput resulting in lost frames or delays in transmission.

SUMMARY OF THE INVENTION

It is an object of the present invention to enable effective deployment of an unlimited range of content to an unlimited number of end users.

The distribution system of the present invention is a distributed or cellular hosting and delivery system for accepting requests for, and delivery of, diverse multi media digital content to end users. It uses a n-tier, multi dimension dynamic data technology to manage all of its information. The delivery system and the end-user unit have compatible yet separate sets of software that allow dynamic user access for user profile management, dynamic tracking and dynamic search capability for diverse multimedia digital content stored anywhere on the system. Further, the software on the end-user unit performs local download and storage management to allow for viewing of any type of digital content.

The system is fully adaptable for any underlying content protocol, user profile and accountability requirements of content providers.

The present invention meets a need for desired access to any digital content when and where wanted by searching a massive amount of content. Another prior art difficulty has been a need for streaming (broadcasting or multicasting), where the end user is connected to the server throughout the viewing period at the same speed as the encoded media (real-time media delivery). If the user's connection speed is slower, the playback has to drop frames and compensate in other ways as well (reduced color data, resolution, etc.). If the user's connection speed is higher than the encoding speed, this difference is not utilized or leveraged, leaving the server to carry the entire load for the full length of content with typically only a second or two of video buffer.

Furthermore, centrally managing and hosting unlimited amounts of content is a near impossible task. These content sources and formats are diversified and therefore difficult to administrate and manage. The present invention includes recognition that if a VOD/COD system is to deliver unlimited amount of content then it must be hosted and managed in a controlled and distributed hosting architecture. This architecture must also support protection against misuse and illegal use of digital content, as well as information tracking of content usage.

Today's users are very sophisticated and demand a satisfactory result when it comes to any media service. They have been exposed to HDTV and large selections of formerly inaccessible content. They also cross boundaries of countries and cultures.

Therefore, the present invention includes recognition if a system is to be reliable and complete in delivering the ultimate user viewing experience, then it must be exclusively serving a small group of users.

To achieve this an independent architecture of end-user information management services is provided. This architecture also must support protection against misuse and illegal use of digital content. Moreover, information tracking of content usage along with delivery of an ultimate user viewing experience providing access to unlimited content is supported.

The invention is described in more detail below with respect to an illustrative embodiment shown in the accompanying drawings in which:

BRIEF DESCRIPTION OF THE DRAWINGS

FIGS. 1a and 1b are a more detailed block diagram of the distributed content hosting system of FIG. 1 and of the STBs depicted in FIG. 1.

DETAILED DESCRIPTION OF THE PREFERRED EMBODIMENTS

Figure 1:
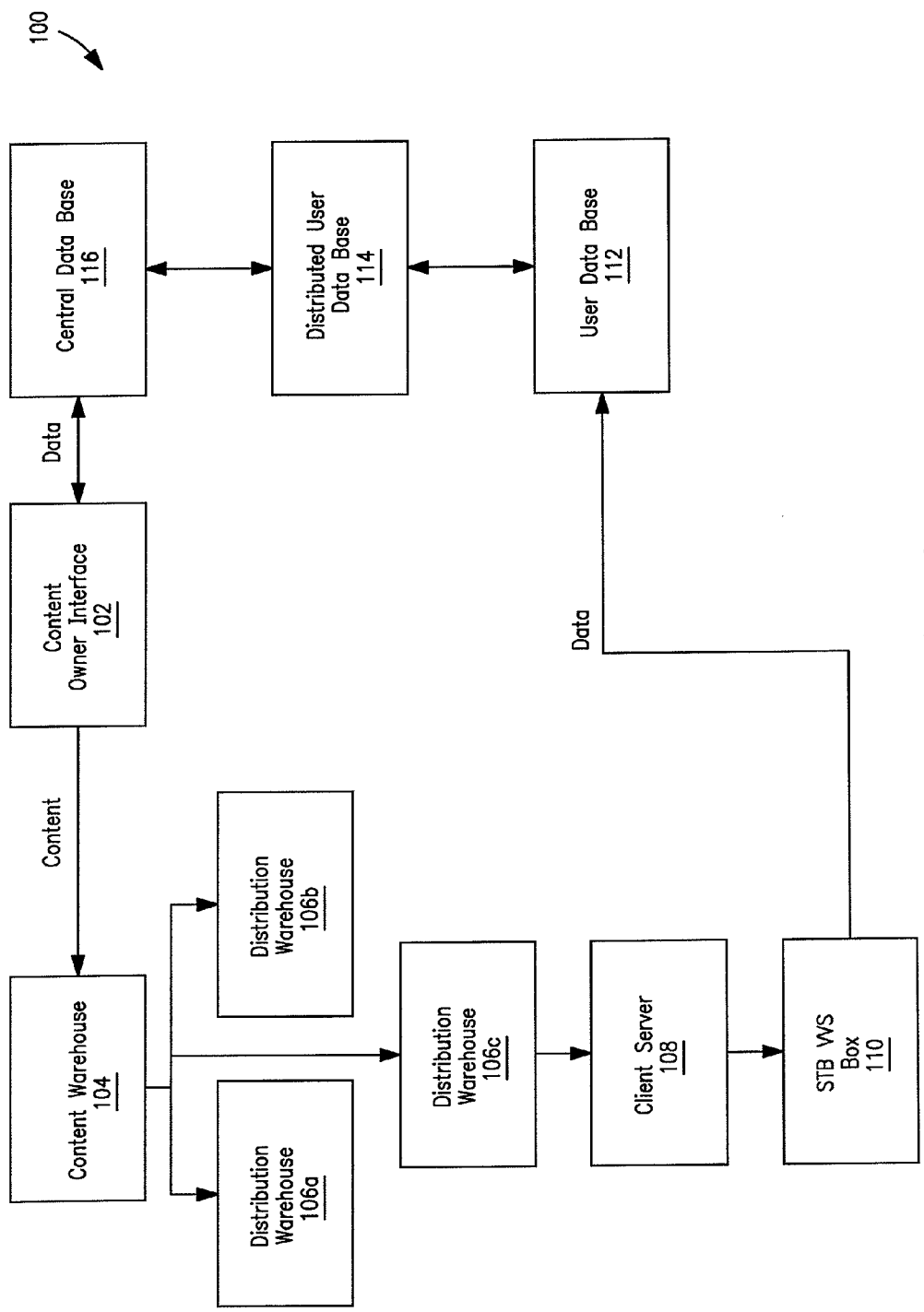
FIG. 1 is a block diagram showing the overall structure of a distributed content hosting and usage tracking system, distributed user information and usage tracking system and end user device implementation of a first preferred embodiment of the invention

The present invention provides distributed systems and a unified method for viewing of any electronically rented or purchased multimedia digital content which may consist of movies, TV shows, documentaries, lectures, electronic interactive presentations, and electronic interactive games whereby these multimedia digital contents can be in any one of the formats supported by the system.

In this system, the content owners are allowed to host a large number of the diverse formats presented of multi media digital content onto one of the distributed hosting servers along with dynamic data structures comprised of search, access, tracking and royalty information.

At the other end the consumer is allowed to register and populate access and viewing preferences to one of the distributed user access and dynamic user tracking systems through a local storage and replay device comprised of two sets of software modules.

One set of the software modules dynamically interacts with the distribution system to manage required local content and information to facilitate user interaction with the distribution system. The information systems may utilize any suitable database system. In a preferred embodiment, the database system may include an adaptive data architecture that includes database management system implementing a primary data structure that is characterized by a fixed data schema. The database management system further includes a secondary data structure that defines a plurality of data relationships between the data elements of the primary data structure on the basis of the data processing rules of the information management system. This type of database management structure allows the primary data to be unaffected by changes to the data processing rules of the information management system. This type of database management system is more fully described in U.S. published patent application 2003/97545 published May 22, 2006 and also described at www.sygenics.com. Such a system described is operative to work with industry-standard relational data base engines (e.g. Oracle, DBS, MMOL).

The second set of the software modules performs tasks for locally playing the user selected digital content and all required management of digital royalty, digital rights and user profile.

Whenever a registered set top box is used by the consumer, it periodically retrieves locally stored user access and viewing preference information. Using existing technology enables user interface to the user viewing medium such as a display device. The said user interface is designed to work with wired or wireless local or remote controllers for user interactions.

Using the controller the consumer is able to search for specific content information from diverse multi media digital content information listed in a dynamic data structure. When the consumer selects the content for viewing, the users' interface module hands over operation to a pre-content player module. The pre-content player module calculates the time required for downloading content for smooth play based on available Internet speed. Using this calculated time and user profile and preferences the module makes a selection and starts playing pre-content. Approaching the end of the pre-content play the module validates the percentage of download of content. If the percentage is within acceptable limits that are pre programmed then the pre-content module hands over the control to a content player, otherwise the pre-content module selects and plays additional pre-content. This operation is repeated until the required percentage of download is achieved.

The content player then requests that the content from the local streaming module to start streaming the content. The local streaming module starts streaming the content and communicating with the DRM (digital rights management) and/or DRT (document related technologies) systems of the content owner(s).

This approach removes the dependency of performing DRM and DRT by a media player therefore any media player that can support streaming and the content format can be used on the generic set top box.

This approach removes the silent waiting period during the downloading of content allowing the system to download a sufficient amount of digital content allowing the local streaming module to stream to the media player to start playing while the rest of the content continues to be downloaded. Furthermore, this not only reduces the need of being constantly connected to the content hosting server at a fixed high bandwidth as required by streaming architecture for video-on-demand but utilizes the maximum bandwidth available, without any loss of data packets, at the user end for only the time required to download the full content.

The present invention provides distributed systems and a unified method for the viewing of any electronically rented or purchased multimedia digital content which may consist of movies, TV shows, documentaries, lectures, electronic interactive presentations, or electronic interactive games. These multimedia digital contents can be in any one of the formats supported by the system. In this system, the content owners are allowed to host a large number of the diverse formats presented of multi media digital content onto one of the distributed hosting servers along with dynamic data structures comprised of search, access, tracking and royalty information. At the other end the consumer is allowed to register and populate access and viewing preferences to one of the distributed user access and dynamic user tracking systems through a local storage and replay device comprised of two sets of software modules.

FIG. 1 depicts a general block diagram of such a distributed and clustered system 100. In particular, the content owner interface 102 includes both content and data paths. The content path will be described first and in a top-down manner from content provider to user. The content is provided to a central content warehouse 104. The content warehouse 104 stores all of the content provided by the content owner. Based on usage, search, tracking, and royalty data content is provided to a plurality of distribution warehouses 106a-c. Each of these individual distribution warehouses provide requested content to a plurality of client servers 108 that then provide the content to the set-top-box (STB) 110 that is associated with an individual user for use by that user. Thus, the combination of the distribution warehouses, client servers, and STBs forms a distribution cluster. It should be appreciated that there may be one or more layers of distribution warehouses and that the number of levels is dependent upon the bandwidth required for such an application and other system requirements.

The data path is a bottom up path from individual user to the central database. User data is generated by the STB 110 and provided to a user database 112. The data collected on each user may include viewing, search, tracking, and royalty data. The user database 112 provides the collected data to a distributed user database that may be one of a plurality of distributed user databases 114a-c. The user data is then collected from the distributed user databases by the central database 116, and the user data that has been collected is accessible by content owner 102.

Figure 1A:
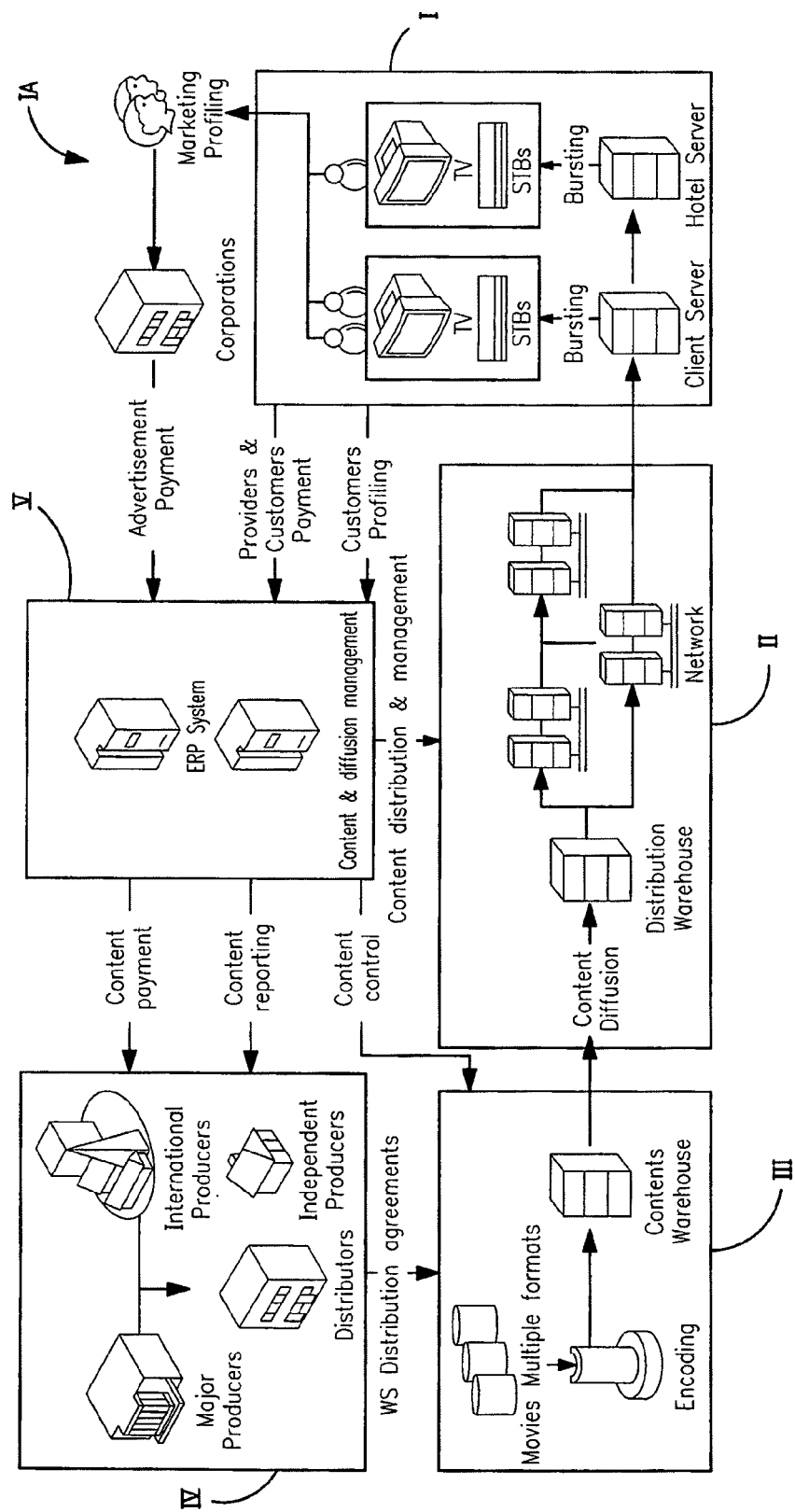
FIG. 1a illustrates the overall cluster configuration structure in multi-tiers.

FIG. 1a provides a more detailed description of how the system 100 provides the content to a user.

(a) Beginning with the end-user customers (content viewers) and local providers generally shown in section I. These end-users may include home viewers, viewers using portable media players, viewers whose usage depends on local providers such as hotels, colleges, and entertainment centers. Each media player has associated therewith, a separate set top box STB, or a local server array in a hotel or school media center. The end-user interacts with the marketing and system owners, section IA, via STB for a variety of uses, e.g., to send and receive searches and to request and receive content therefrom.

(b) The content distribution system is a dedicated distributed content management system, shown generally in section II. The distribution management system may include a plurality of distribution warehouses, which in the present invention is a low level repository of content. Each such distribution warehouses is designed to service a group of users, which may typically number about 2000. A user base of 100,000 within the user population of I might thus be served by about 50 such distribution warehouses.

(c) A central warehouse facility, generally shown in section III serves those distribution warehouses. In general the central warehouse receives content from an encoding means that is responsible for encoding multiple format content. The encoding means receives diverse content formats from a universe of content providers, shown generally in section IV, and encodes them into common digital format with appropriate software and metadata, compatible with those of the systems I, II.

(d) The foregoing content distribution system is under the control of an overall management system, shown generally in section V, that includes enterprise resource management and content and diffusion management components. This management system provides for, effecting payment to content providers for end-user usage and for collateral revenue (e.g. advertising) as well as reports of usage and other market feedback data. In addition, the management system provides for the control of the encoding and central warehouse systems in section II and the distribution warehouse system in section III. The management system, in response to customer usage patterns and other profiling obtained from the end-user data, enables the distribution system to provide a limited content library to the distribution warehouses that is unique and tailored to the needs of the cluster of users served by that one distribution warehouse. However, if an end user of such a cluster sends a request to its local or remote seller, e.g., a hotel or national service, for content that is not held by the distribution warehouse, i.e., a video that is not contained within the limited content library of the distribution warehouse, the control system can access the requested item from the central contents warehouse and provide it to the appropriate distribution warehouses for download to the requesting end-user.

(e) The content profiles of distributed warehouses can be re-evaluated continuously or periodically on the basis of collected user data including search, viewing, tracking, and request data and adjusted by the removals or additions of content to the distribution warehouses.

(f) In addition to facilitating speed of streaming and separate processing of metadata and content, the system is scalable by the addition of distribution warehouses and distribution databases to serve an increasing number of end-users without degradation of speed. In addition, the distributed nature of content based on collected user data allows for a more robust system by providing an increased tolerance for central system warehouse outages/failures.

Referring to FIGS. 1, 1a, and 1b, the STB 110 collects and locally stores the desired data at local storage device 18, which is a part of the user database 112. The collected data is periodically provided to a single distributed user database 114. The end-user interacts with the STB via a web browser 12. Web browser module 12 builds a user interface from local and online information and data and displays the user interface via output interface 9 and switching module 10. User interaction management module 14 interacts with user input via the user interface provided by web browser 12, switching module 10 and media player 11. Based on end-user action the management module 14 requests browser 12 to modify the user interface, request media player 11 to play media from local storage 18 via local streaming module 20, or to download media through local media delivery module 13. In addition, the user interaction module 14 also informs switching module 10 to switch between media player 11 or web browser 12 output. In addition, the STB 110 also controls the user interface and the playing of content for the end-user. In particular, pre-content management module 15 periodically and interactively communicates with a single distributed user information system 114, to which the STB is registered. Data that is collected from the distributed user information system 114 may be locally stored at local storage device 18.

User interaction management module 14 also interacts with user selected content management module 16 for requesting burst download of content to local storage device 18 or to local streaming module 20. Content management module 16 also interacts with an external distributed user information and usage tracking system 114 and/or central content hosting and content information/usage tracking information system 116 to provide information/usage tracking data and further manages the removal of locally stored content when appropriate. The system is thus able to register every active user and collect and synchronize end-user information and the distributed user data base 114 and the central database 116.

Figure 2:
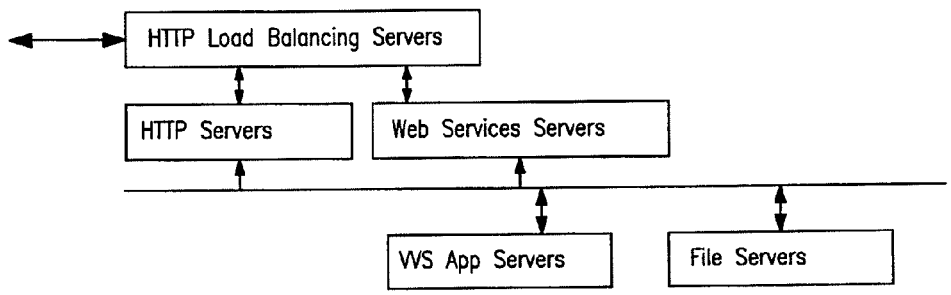
FIG. 2 is a block diagram showing the component hardware relationship of the environment described in FIG. 1.

FIG. 2 depicts a general block diagram of an example of the architecture of the various systems in FIGS. 1, 1a, and 1b. In particular, the central content warehouse, central database, distribution warehouse, and the distributed user database typically include load balancing servers, app servers to host sub system management system applications and web servers to allow external information and authentication communication. Each of these systems, http load balancing server 21, http servers 22; web service server 23; app servers 24; and HP server 25 is independent and is able to adapt and to be scaled to support an unlimited number of users. The http servers transfer/upload digital files to end users using the HTTP protocol. The, file servers store the digital content. The application (App) servers host the associated management system applications and web services servers allow external information and authentication communication. The load balancing servers support the http and web service servers.

Figure 3:
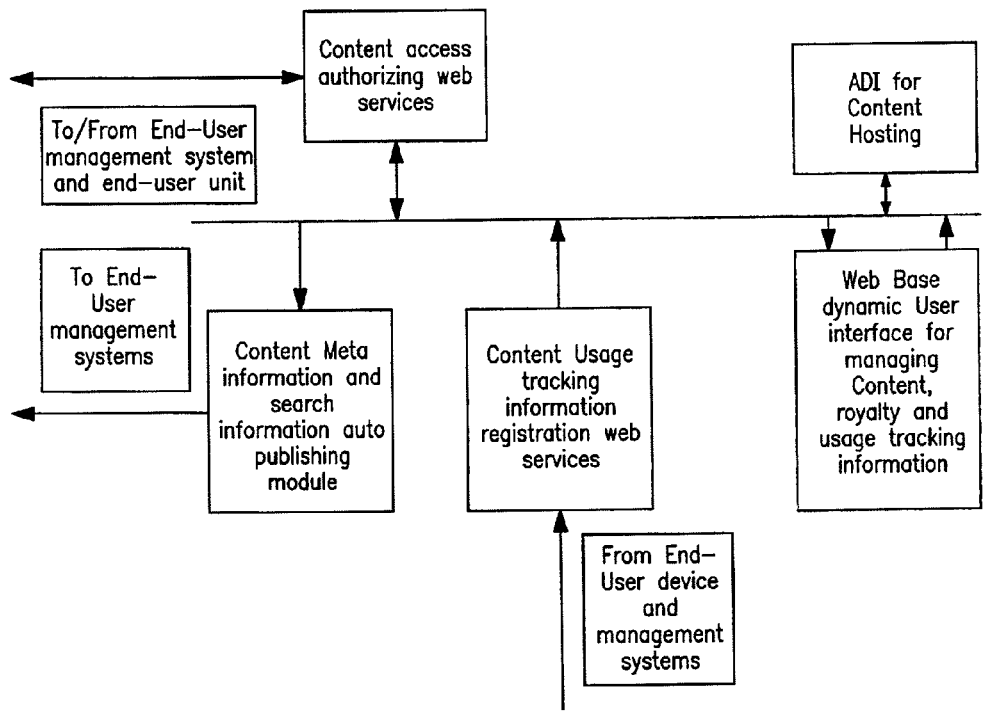
FIG. 3 is a diagram showing the process of the data relationship of video server applications for the content management environment depicted in FIG. 1a for supporting single end-user units.

Referring to the FIG. 3 block diagram the processes of the data relationship of the distribution warehouse content hosting environment and STB is shown. The processes are seen to include an application data interface (ADI) for content hosting 31; web base dynamic user interface 32 managing content, royalty and usage tracking information; content usage tracking information and registration web services 33 (from end user devices and the management system); content meta-information and search information into publishing module 34 (to end user management systems); and content access authorizing web services 35 (to/from the end user management system and the end-user unit).

Figure 4:
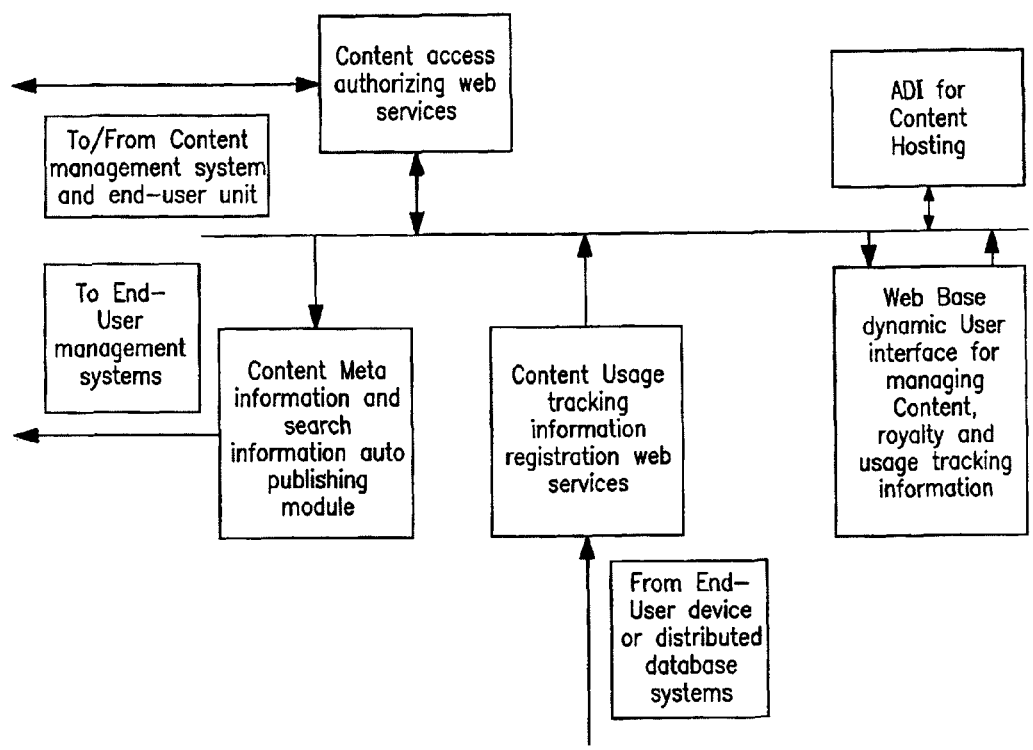
FIG. 4 is a diagram showing the process of the data relationship of video server applications of the management of the end user environment for the environment depicted in FIG. 1a for supporting multiple end-user units.

Referring now to FIG. 4, FIG. 4 is a block diagram depicting the data relationships of a video server application for the single system for supporting multiple end-user units. It describes the internal and external business information processing components (data components). The FIG. 4 hardware block diagram shows the general architecture of the central database 116 and the distributed use database 114 for the management of the various sub-systems as described in FIG. 1. It is seen to include an application data interface (ADI) 51 for content housing web base dynamic user interface 52 managing content, royalty and usage tracking information; content usage tracking information and registration web services 53 (from end user devices and the management system); content meta-information and search information into publishing module 54 (to end user management systems); and content access authorizing web services 55 (to/from the end user management system and the end-user unit).

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

The invention claimed is:

1. A method of digital content distribution comprising the steps of:
   providing selections of digital content from a user;
   continuously updating user information associated with the user, wherein user profiles are obtained from said user information, said user profiles being used by a distribution system to provide digital content from a central content warehouse to a distribution content warehouse;
   calculating time required for downloading digital content corresponding to the selection of digital content for smooth play based on available network speed;
   identifying pre-content based on the calculated time and the continuously updated user information, pre-content being other content played before completion of download of the digital content corresponding to the selection of digital content; and
   playing the identified pre-content until a pre-selected percentage of the download of the digital content corresponding to the selection of digital content achieved.

2. The method in accordance with claim 1
   wherein the digital content corresponding to the selection of digital content is requested from a streaming module;
   wherein rights associated with the digital content and the user information are tested for validity; and
   wherein the digital content corresponding to the selection of digital content is streamed if the rights are valid.

3. The method in accordance with claim 1
   wherein content profiles are received at the distribution system;
   wherein diverse content is received from content providers based on the content profiles;
   wherein the diverse content is encoded into a common digital format;
   effecting receipt of revenue for the diverse content;
   wherein payment of at least part of the revenue is effected to the content providers;
   wherein at least a part of the diverse content is provided to the distribution data warehouses based on a cluster of users associated with the distribution data warehouses and the content profiles; and
   wherein the cluster of users is adjusted based on changes in the content profiles.

\* \* \* \* \*